United States Patent [19]

Murayama et al.

[11] 4,095,142
[45] June 13, 1978

[54] HIGH FREQUENCY DISCHARGE LAMP FOR A SPECTRAL-LINE SOURCE

[75] Inventors: Seiichi Murayama, Kokubunji; Manabu Yamamoto, Odawara; Masaru Ito, Kodaira; Makoto Yasuda, Kokubunji, all of Japan; Makoto Watanabe, Hinsdale, Ill.; Kunifusa Kayama, Tokyo, Japan

[73] Assignee: Hitachi, Ltd., Japan

[21] Appl. No.: 762,174

[22] Filed: Jan. 24, 1977

[30] Foreign Application Priority Data

Feb. 2, 1976 Japan .................................. 51-9378

[51] Int. Cl.² ....................... H05B 41/24; H05B 9/00
[52] U.S. Cl. .................................. 315/248; 315/246; 219/10.81; 313/25; 313/201; 356/85
[58] Field of Search ................................ 315/248, 246

[56] References Cited

U.S. PATENT DOCUMENTS

2,656,256  10/1953  Yeater ........................... 315/246 X
3,950,670  4/1976  Hruda ............................. 356/85 X

FOREIGN PATENT DOCUMENTS

1,344,145  1/1974  United Kingdom ................ 315/246

Primary Examiner—Alfred E. Smith
Assistant Examiner—Charles F. Roberts
Attorney, Agent, or Firm—Craig & Antonelli

[57] ABSTRACT

A high frequency discharge lamp for a spectral-line source includes a discharge envelope in which a substance contributive to the emission of desired spectral lines is contained and in which one electrode is included, the discharge envelope being made of a material, such as quartz, which is electrically insulating and capable of transmitting the spectral lines. A cylindrical metallic container surrounds the discharge envelope and has at a part thereof an opening for taking out the spectral lines. There is further provided means for applying a high-frequency voltage between the electrode and the metallic container.

3 Claims, 4 Drawing Figures

FIG. 3
FIG. 4
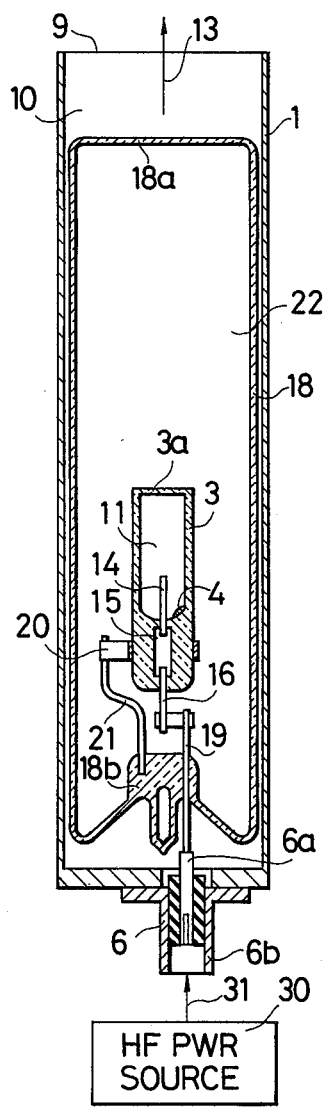
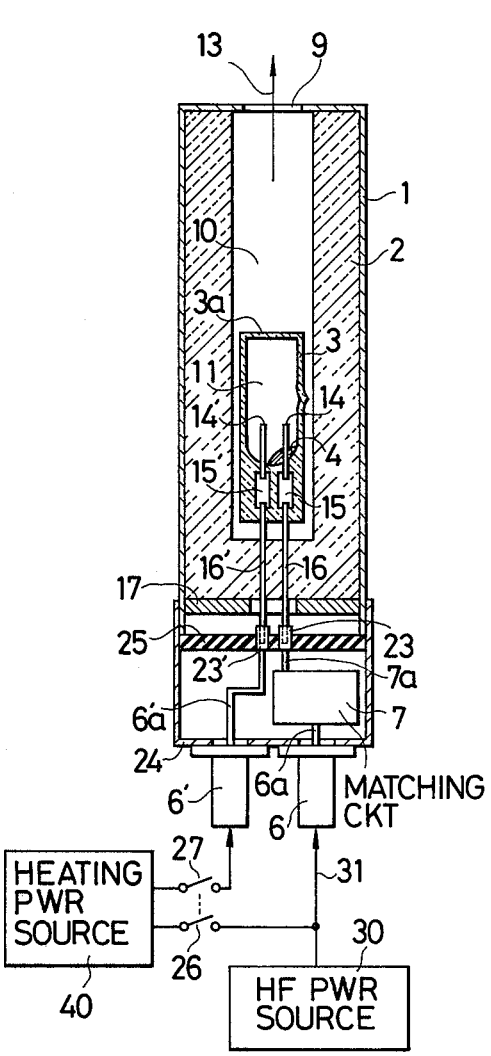

HIGH FREQUENCY DISCHARGE LAMP FOR A SPECTRAL-LINE SOURCE

BACKGROUND OF THE INVENTION

1. Field of the Invention

This invention relates to improvements in a high frequency discharge lamp for a spectral-line source which can be effectively used as a light source in, for example, spectroscopic measurements etc.

2. Description of the Prior Art

A feature in the high frequency discharge is that the multiplication of electrons takes place and the discharge starts merely in such a way that electrons accelerated by an electric field ionize gaseous molecules (atoms) by collision (even when positive ions exist, they hardly move because their masses are great and the duration of the electric field in one direction is short). That is, in the d.c. or low frequency discharge, the generation of charged particles based on the collision between charged particles and an electrode or the generation of electrons (thermions) from an electrode is an important factor, whereas in the high frequency discharge, the emission of electrons from an electrode is no required. Since a spectrum owing to such high frequency discharge is produced from a comparatively large space, it has the merits of a high spectral-line intensity and a very narrow spectral-line width. It is therefore suitable for uses as light sources in the atomic absorption spectroscopy, the atomic fluorescence spectroscopy etc.

FIG. 1 shows the schematic construction of a high-frequency electrodeless discharge lamp which has hitherto been employed as a kind of spectral light source exploiting the high frequency discharge. A discharge envelope 3 which is made of an electrically-insulating and light-transmitting material such as quartz is arranged within a space 10 surrounded by a wall of a heat insulating material 2 provided inside a cylindrical metallic container serving as a high-frequency shield 1. The discharge envelope 3 need not be wholly formed of light transmitting material, but only a part thereof (end wall part 3a in the figure) may well be formed of light transmitting material (material capable of transmitting spectral lines).

Contained in the discharge envelope 3 are a filling substance 4 and a firing rare gas which is easily ionized and which is stable. The filling substance 4 is made up of a substance contributive to the light emission, that is, a simple substance element which generates the desired spectral lines and/or a halide, for example, of the element which vaporizes more easily than in the case of the simple substance.

A coil 5 through which a high frequency current flows is disposed around the discharge envelope 3. The high frequency output of a high frequency power source 30 whose output frequency is higher than about 1 MHz is led to a connector 6 by a coaxial cable 31. The high frequency power is subsequently fed to a matching circuit 7 through lead wires 6a and 12, and after passing through the matching circuit 7, it is supplied to the coil 5 through lead wires 8 and 8′. A high-frequency magnetic field is produced in the internal space 11 of the discharge envelope 3 by the high frequency current flowing through the coil 5. An induces electric field of a magnitude proportional to the time variation of the high-frequency magnetic field is generated, to cause the high frequency discharge in the firing rare gas. The interior of the discharge envelope is heated by this high frequency discharge, and the filling substance 4 is volatilized. (There is also a method wherein an external heating coil is separately provided, by which the filling substance 4 is heated and volatilized.)

The molecules of the filling substance 4 volatilized into the discharge space 11 are excited by colliding with electrons generated by the high frequency discharge, and radiate spectral lines inherent to the molecules. Otherwise, the molecules are dissociated by colliding with the electrons, atoms produced by the dissociation are excited by collision with the electrons, and the atoms radiate spectral lines inherent to the element. The spectral lines are transmitted through the end wall 3a of the discharge envelope 3. Subsequently, they are taken out as shown by an arrow 13 through an observation window 9 which is provided in the metallic container 1.

In case of employing the prior-art high-frequency electrodeless discharge lamp stated here, there are problems as described below. Firstly, unless the inside diameter of the metallic container 1 is sufficiently large as compared with the outside diameter of the coil 5 for passing the high frequency current therethrough, the electromagnetic coupling between the coil 5 and the shielding metallic container 1 becomes significant, and electric power which is actually used for the high frequency discharge decreases. Usually, the inside diameter of the metallic container 1 is made 2 to 3 or more times greater than the outside diameter of the coil 5. This incurs the disadvantage that the whole light source cannot be constructed to have a small size. Secondly, the electric field intensity necessary for starting the high frequency discharge is much higher than the electric field intensity required for maintaining the discharge after having been once started. Therefore, unless a high frequency power source of high power is used, the required high frequency discharge cannot be started. This incurs the disadvantage that the whole apparatus including the high frequency power source beomes large-sized and expensive.

To the end of eliminating the disadvantages in the case of employing the prior-art high-frequency electrodeless discharge lamp set forth above, there have been already proposed improvements in the high-frequency electrodeless discharge lamp as disclosed in Japanese Patent Application Public-disclosure No. 41572/1973. In the proposal, in order to supply the high-frequency electric field into the discharge envelope on the principle of a coaxial waveguide (or coaxial cable), the discharge envelope is placed on the fore end of the inner conductor of the coaxial waveguide inside the outer conductor thereof. In addition, thermal radiation means for heating and volatilizing the filling substance in the discharge envelope is provided outside the outer conductor. In this case, the outer conductor which surrounds the periphery of the discharge envelope acts as a resonator for high frequencies. Accordingly, the high-frequency electric field is intensely concentrated on the fore end part of the inner conductor, and it is also formed within the discharge envelope placed on the fore end of the inner conductor through the resonating outer conductor, whereby the vapor of the filling substance is excited and caused to emit light. In the discharge lamp according to the proposal, however, the discharge envelope is placed on the fore end part of the inner conductor on which the high-frequency electric field is intensely concentrated, so that the portion of quartz glass forming the discharge envelope which lies in contact with the fore end part of the inner conductor is rapidly deteriorated and that the discharge envelope is destroyed when used for about 24 hours.

SUMMARY OF THE INVENTION

It is accordingly an object of this invention to provide a high frequency discharge lamp for a spectral-line source which is free from the disadvantages of the prior-art spectral-line source exploiting the high frequency discharge and which is small in size, long in life and low in cost.

In order to accomplish the object, according to this invention, an internal electrode made of an electric conductor is provided inside a discharge envelope and has a high frequency voltage applied thereto, and such discharge envelope is arranged in a metallic container acting like a resonator for high frequencies. Thus, the construction of the whole light source becomes small-sized, and an intense electric field arises locally in the vicinity of the internal electrode in the discharge envelope. Therefore, the starting of discharge becomes very easy. In addition, the problem of the local early deterioration of the discharge envelope is eliminated, and the discharge lamp becomes long in life.

Other objects and features of this invention and functional effects achieved thereby will be self-explanatory in the following description of embodiments.

BRIEF DESCRIPTION OF THE DRAWING

FIG. 3 is a vertical sectional sketch showing the schematic construction of a high frequency discharge lamp for a spectral-line source according to another embodiment of this invention, and FIG. 4 is a vertical sectional sketch showing the schematic construction of a high frequency discharge lamp for a spectral-line source according to still another embodiment of this invention.

DESCRIPTION OF THE PREFERRED EMBODIMENTS

Figure 1:
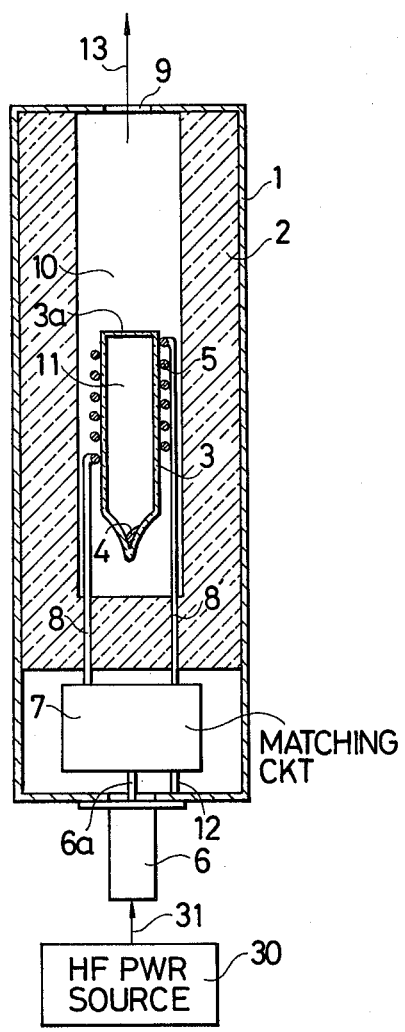
FIG. 1 is a vertical sectional sketch showing the schematic construction of an example of a prior-art high-frequency electrodeless discharge lamp.
Figure 2:
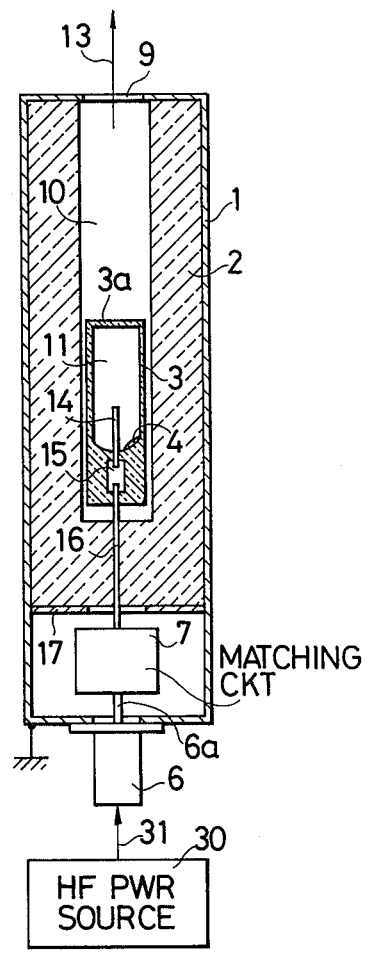
FIG. 2 is a vertical sectional sketch showing the schematic construction of a high frequency discharge lamp for a spectral-line source according to an embodiment of this invention.

FIG. 2 shows the schematic construction of a high frequency discharge lamp for a spectral-line source according to an embodiment of this invention. In the figure, numeral 14 designates an electrode provided inside a discharge envelope 3, numeral 16 a lead wire of the electrode 14, numeral 15 a metallic foil for connecting the electrode 14 and the lead wire 16, and numeral 17 a shield plate for a matching circuit 7. The other reference numerals designate the same parts as in FIG. 1.

The metallic container 1 is, for example, cylindrical. It is arranged concentrically with the electrode 14, and has grounded potential applied thereto. The discharge envelope 3 is wholly made of a material which is electrically insulating and adapted to transmit the spectral lines, such as quartz glass. In some cases, it is also possible that only a part for taking out light (the part of the end wall 3a in the figure) is made of the electrically-insulating and spectral line-transmitting material, while the other part is made of an electrically-insulating material. In case where the material of the discharge envelope 3 is quartz, the metallic foil 15 for the connection between the electrode 14 and the lead wire 16 is of molybdenum, platinum or the like, and hermetic sealing for the introduction of the electrode 14 is done at a part at which the three members 14, 15 and 16 are connected. As the material of the electrode 14, there is usually employed a metal difficult to melt, such as tungsten, tantalum and molybdenum. Sometimes, the electrode 14 itself (the whole body or at least the fore end part thereof) may be made of a substance intended for the spectral line emission. In such case, it is unnecessary to separately contain the substance 4 for the spectral line emission within the discharge envelope 3. The output of the high frequency power source 30 is inputted from the connector 6 through the coaxial line (coaxial waveguide or coaxial cable) 31, and is led to the electrode 14 through the matching circuit 7 as well as the lead wire 16. The lead wire 16 and the electrode 14 are in the concentric arrangement with respect to the metallic container 1. The lead wire 16 and the electrode 14 function as the inner conductor of the coaxial waveguide, while the metallic container 1 functions as the outer conductor of the coaxial waveguide. The internal space 10 of the metallic container 1 functions as a cavity resonator for high frequencies. Accordingly, an intense electric field of high frequency is formed in the vicinity of the fore end part of the electrode 14 as corresponds to the open end of the coaxial waveguide. The high frequency discharge is very easily started by the intense high-frequency electric field. The internal space 11 of the discharge envelope 3 is heated by the high frequency discharge. In consequence, the filling substance 4 is excited and radiates spectral lines inherent therein. The spectral lines are transmitted through the end wall 3a of the discharge envelope 3, and are taken out from the end opening 9 of the metallic container 1. According to such construction, since the portion on which the high-frequency electric field is intensely concentrated is the vicinity of the fore end part of the electrode (made of the metal) 14 provided within the discharge envelope 3, the local deterioration of the discharge envelope 3 does not occur, and hence, the discharge lamp becomes long in life.

FIG. 3 shows the schematic construction of a high frequency discharge lamp for a spectral-line source according to another embodiment of this invention. In this embodiment, a vacuum casing 18 is provided inside the cylindrical metallic container 1, and the discharge envelope 3 is arranged therein. The internal space 22 of the vacuum casing 18 is evacuated to a vacuum. The evacuated space 22 acts similarly to the heat insulator wall 2 in the embodiment of FIG. 2. The vacuum casing 18 is wholly constructed of a material which is electrically insulating and capable of transmitting the spectral lines, such as quartz. As an alternative example, it is allowed that only the part (end wall 18a in the figure) of the vacuum casing 18 for taking out the spectral lines is constructed of the electrically-insulating and spectral line-transmitting material such as quartz, while the other part is constructed of a mere electrically-insulating material. The discharge envelope 3 is fixed and supported by a fixing band 20 at the fore end of a supporting stem 21 which is planted in the sealed part 18b of the vacuum casing 18.

In order to supply the high frequency power to the electrode 14 provided in the discharge envelope 3, a lead-in wire 19 is provided in a manner to penetrate through the sealed part 18b. One end of the lead-in wire 19 is connected to the inner conductor 6a of the coaxial connector 6, and the other end to the lead wire 16. The metallic container 1 is connected with the outer conductor 6b of the coaxial connector, and is usually held at ground potential.

Also in this case, the electrode 14 is coaxially arranged on the axis of the metallic container 1. Accordingly, the internal space of the metallic container 1 functions as a cavity resonator for high frequencies. Therefore, in case where the high frequency power is supplied from the high frequency power source 30, an intense high-frequency electric field is formed in the vicinity of the fore end part of the electrode 14, and the high frequency discharged is easily started. By the high frequency discharge, the filling substance 4 in the discharge envelope 3 is evaporated and excited, to radiate the inherent spectral lines. The spectral lines are transmitted through the end wall 3a of the discharge envelope 3 and the end wall 18a of the vacuum casing 18, and are taken out through the end opening 9 of the metallic container 1.

In the embodiment of FIG. 3, the discharge envelope 3 is arranged in the vacuum casing 18, and the heat insulation of the discharge envelope 3 is performed by the evacuated space 22. Therefore, the heat insulating effect is high, and the loss of the high-frequency electric power diminishes to that extent.

FIG. 4 shows the schematic construction of a high frequency discharge lamp for a spectral-line source according to still another embodiment of this invention. In this embodiment, two electrodes 14 and 14' are provided in the discharge envelope 3. The electrodes 14 and 14' are connected to lead wires 16 and 16' through metallic foils 15 and 15', respectively.

An adapter 24 in which the matching circuit 7 is accommodated is provided under the metallic container 1. The metallic container 1 is detachably fitted in the adapter 24. To this end, the adapter 24 is provided with attachment plugs 23 and 23' for receiving the lead wires 16 and 16' respectively, the attachment plugs being supported by an insulating plate 25. The adapter 24 is also provided with connectors 6 and 6'. The connector 6 is connected to the matching circuit 7 through a lead wire 6a, and further to the attachment plug 23 through a lead wire 7a. The connector 6' is directly connected to the attachment plug 23' through a lead wire 6'a.

In this embodiment, before performing the high frequency discharge in the discharge envelope 3, a d.c. voltage or an a.c. voltage of low frequency (which may be a commercial frequency) is applied between the electrodes 14 and 14' so as to cause discharge, whereby the interior of the discharge envelope 3 can be preheated. To this end, a heating power source (d.c. or low-frequency a.c. power source) 40 is provided, the output voltage of which is inputted from the connectors 6 and 6' through switches 26 and 27 and is supplied between the electrodes 14 and 14'. Thus, the d.c. or low-frequency a.c. discharge occurs between the electrodes 14 and 14' and preheats the internal space of the discharge envelope 3.

When, owing to the preheating, the temperature in the discharge envelope 3 has risen and the vapor pressure of the filling substance 4 has risen, the switches 26 and 27 are opened to cut off the supply of the heating power. Subsequently, the high frequency power from the high frequency power source 30 is supplied between the electrode 14 and the metallic container 1, to induce the high frequency discharge in the discharge envelope 3 and to excite the vapor of the filling substance 4 and cause it to emit light. The spectral lines obtained are transmitted through the end wall 3a of the discharge envelope 3, and are taken out through the end opening 9 of the metallic container 1.

When the interior of the discharge envelope 3 is preheated in this manner, the commencement of the high frequency discharge becomes still easier than in the case of causing the high frequency discharge from the beginning. In addition, the period of time required for the spectral-line intensity to be stabilized can be remarkably shortened.

Besides the foregoing embodiments, various modifications can be mentioned. For example, in the embodiment shown in FIG. 3, it is also possible to provide a matching circuit between the electrode 14 and the connector 6. A construction is also possible in which the spectral light generated in the discharge envelope 3 is taken out in the radial direction of the cylindrical metallic container 1 (in the direction orthogonal to the axis). Further, although the heat insulator wall 2 is disposed between the discharge envelope 3 and the metallic container 1 in the foregoing embodiments, it is also allowed to dispose the metallic container 1 directly at the outer periphery of the discharge envelope 3 and to dispose the heat insulator wall at the outer periphery of the metallic container 1.

As set forth above, according to this invention, there is provided the high frequency discharge lamp for a spectral-line source which is small in size, which does not undergo the local deterioration of the discharge envelope, which is long in life and which is economical.

We claim:

1. A high frequency discharge lamp for a spectral-line source comprising a discharge envelope which is made of an electrically-insulating material and at least a part of which has a transmissivity for spectral lines, a filling substance which is contributive to radiation of the several spectral lines and which is contained in said discharge envelope, an electrode which is provided in said discharge envelope, a casing having the interior evacuated to a vacuum and at least a part of which has a transmissivity for the spectral lines, said discharge envelope being disposed in said casing, a metallic container which surrounds said casing and said discharge envelope and which has at a part thereof an opening for taking out the spectral lines, and voltage supply means for supplying a high frequency voltage between said electrode and said metallic container.

2. The high frequency discharge lamp for a spectral-line source according to claim 1, wherein said metallic container is cylindrical.

3. The high frequency discharge lamp for a spectral-line source according to claim 2, wherein said electrode and the cylindrical metallic container are coaxially arranged.

* * * * *